United States Patent
Yamaguchi et al.

(10) Patent No.: US 10,893,386 B2
(45) Date of Patent: Jan. 12, 2021

(54) MOBILE TERMINAL POSITION DETECTING DEVICE

(71) Applicant: DENSO CORPORATION, Kariya (JP)

(72) Inventors: Taichi Yamaguchi, Kariya (JP);
Munenori Matsumoto, Kariya (JP);
Kenichiro Sanji, Nisshin (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/535,721

(22) Filed: Aug. 8, 2019

(65) Prior Publication Data

US 2019/0364391 A1 Nov. 28, 2019

Related U.S. Application Data

(63) Continuation of application No. PCT/JP2018/008204, filed on Mar. 5, 2018.

(30) Foreign Application Priority Data

Mar. 15, 2017 (JP) .................................. 2017-049271

(51) Int. Cl.
*H04W 4/029* (2018.01)
*H04B 17/27* (2015.01)
(Continued)

(52) U.S. Cl.
CPC ............ *H04W 4/029* (2018.02); *H04B 1/082* (2013.01); *H04B 17/27* (2015.01); *H04W 4/40* (2018.02)

(58) Field of Classification Search
CPC ........ H04W 4/029; H04W 4/40; H04B 17/27; H04B 1/082
(Continued)

(56) References Cited

U.S. PATENT DOCUMENTS 5,990,826 A * 11/1999 Mitchell ................. G01S 1/042
342/357.64
6,639,555 B1 * 10/2003 Kane ....................... H01Q 1/32
343/700 MS
(Continued)

FOREIGN PATENT DOCUMENTS

JP   2003248045 A   9/2003
JP    200842577 A   2/2008
(Continued)

*Primary Examiner* — Charles N Appiah
*Assistant Examiner* — Nicole M Louis-Fils
(74) *Attorney, Agent, or Firm* — Harness, Dickey & Pierce, P.L.C.

(57) ABSTRACT

A reception strength detection unit is connected to reception antennas located in a vehicle compartment and detects a reception strength of a radio wave from a mobile terminal for each of the reception antennas. A reception determination unit is connected to an auxiliary antenna located at a predetermined position that is a blind spot of the reception antenna and determines whether the radio waves has been received by the auxiliary antenna. When the radio wave has not been received by the auxiliary antenna, an existence position calculation unit calculates an existence position of the mobile terminal based on the reception strength detected by the multiple reception antennas. When the radio wave is received by the auxiliary antenna, the existence position determination unit determines the predetermined position at which the auxiliary antenna receiving the radio wave is located as the existence position of the mobile terminal.

13 Claims, 9 Drawing Sheets

(51) Int. Cl.
*H04W 4/40* (2018.01)
*H04B 1/08* (2006.01)

(58) Field of Classification Search
USPC ......................................................... 455/456
See application file for complete search history.

(56) References Cited

U.S. PATENT DOCUMENTS

| | | | |
|---|---|---|---|
| 6,690,940 B1 | 2/2004 | Brown et al. | |
| 2003/0151240 A1* | 8/2003 | Saitou | B60R 21/0154 |
| | | | 280/735 |
| 2008/0195261 A1* | 8/2008 | Breed | B60N 2/0232 |
| | | | 701/2 |
| 2011/0134004 A1* | 6/2011 | Takatsuka | H01Q 1/1264 |
| | | | 343/757 |
| 2013/0054095 A1* | 2/2013 | Suzuki | B60R 25/245 |
| | | | 701/48 |
| 2014/0188309 A1* | 7/2014 | Caratto | B60R 25/00 |
| | | | 701/2 |
| 2018/0035433 A1* | 2/2018 | Zielinski | H01Q 1/3275 |
| 2018/0103022 A1* | 4/2018 | Tokunaga | H04L 63/0853 |

FOREIGN PATENT DOCUMENTS

| | | |
|---|---|---|
| JP | 2009-177588 A | 8/2009 |
| JP | 201140959 A | 2/2011 |

\* cited by examiner

MOBILE TERMINAL POSITION DETECTING DEVICE

CROSS REFERENCE TO RELATED APPLICATION

The present application is a continuation application of International Patent Application No. PCT/JP2018/008204 filed on Mar. 5, 2018, which designated the U.S. and claims the benefit of priority from Japanese Patent Application No. 2017-49271 filed on Mar. 15, 2017. The entire disclosures of all of the above applications are incorporated herein by reference.

TECHNICAL FIELD

The present disclosure relates to a mobile terminal position detecting device.

BACKGROUND

In recent years, occupants in a vehicle carry mobile terminals configured to perform wireless communications. Occupants with mobile terminals may be located at various positions in or around the vehicle.

SUMMARY

According to an aspect of the present disclosure, a mobile terminal position detecting device is configured to detect an existence position of a mobile terminal in a vehicle compartment by detecting a radio wave from the mobile terminal. The mobile terminal position detecting device is configured to detect a position of the mobile terminal by detecting a reception strength of the radio wave from the mobile terminal by using antennas.

BRIEF DESCRIPTION OF THE DRAWINGS

The above and other objects, features and advantages of the present disclosure will become more apparent from the following detailed description made with reference to the accompanying drawings. In the drawings.

DESCRIPTION OF EMBODIMENTS

Figure 1:
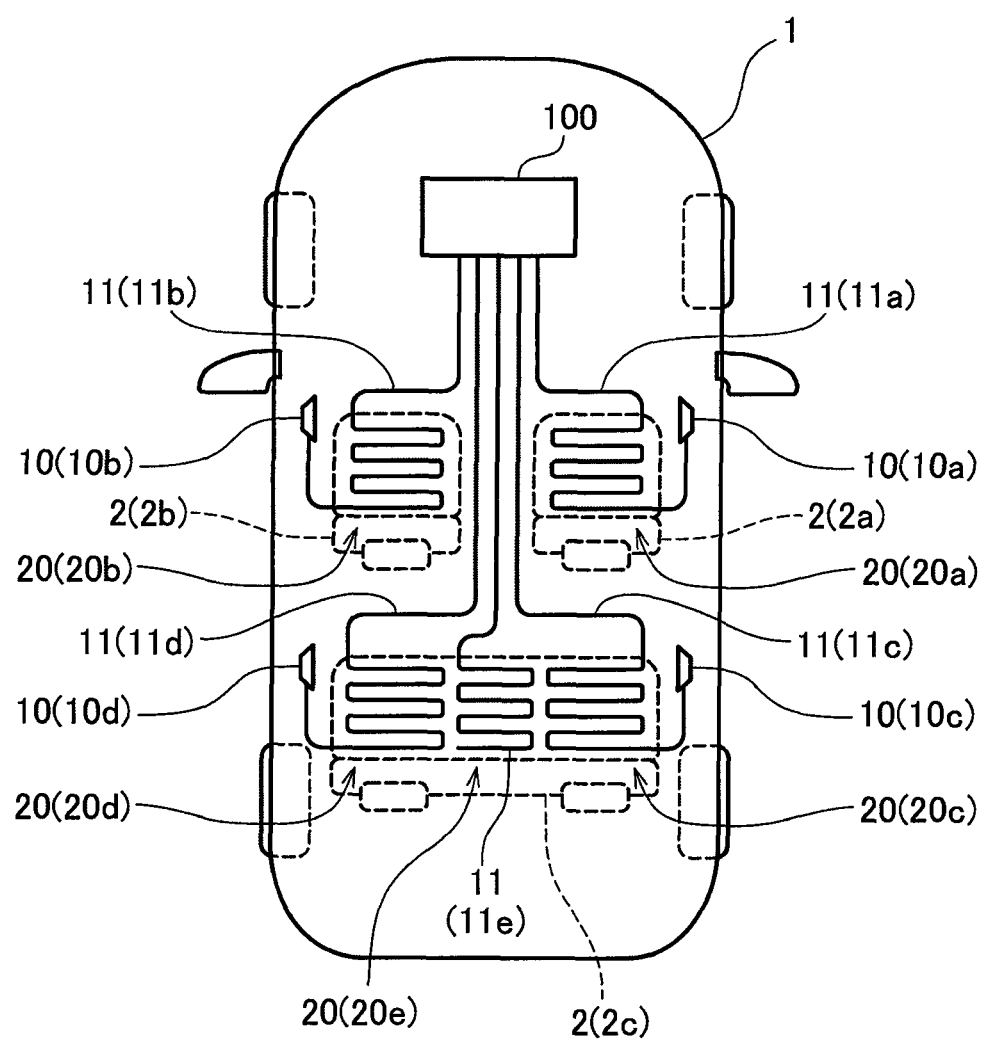
FIG. 1 is an illustrative view showing a rough structure of a vehicle on which a mobile terminal position detecting device is mounted according to the present embodiment.

To begin with, investigations which have been made with respect to the present disclosure will be described.

Nowadays, a large number of occupants of a vehicle carry mobile terminals configured to performing wireless communications. It is conceivable to provide various services based on a position of an occupant detected in a vehicle compartment and/or around a vehicle. An assumable configuration to detect a position of a mobile terminal thereby to detect a position of an occupant is to receive a radio wave from a mobile terminal by using antennas installed in multiple places of the vehicle.

In general, reception intensities of the radio waves received by using the antenna decrease as a distance from a transmission source of the radio wave increases. Therefore, the above assumable configuration may be enabled to estimate a distance from each antenna to the mobile terminal on the basis of the reception intensities of the radio waves received by using the antennas installed at the multiple places. The assumable configuration could require, in principle, at least three antennas to detect the location where the mobile terminal is present and thereby to detect the location of the occupant carrying the mobile terminal.

It is noted that, the assumable configuration would actually require installation of a large number of antennas in order to detect the position of the mobile terminal with sufficient accuracy. The reasons are as follows.

First, when a radio wave transmitted from the mobile terminal encounters an obstacle (for example, a human body) before reaching the antenna, the radio wave is possibly attenuated, and consequently, the reception intensity of the radio wave at the antenna may be reduced. As a result, the assumable configuration could erroneously estimate the distance from the antenna to the mobile terminal to be longer than the actual distance. Therefore the assumable configuration could erroneously detect the position of the mobile terminal.

In order to avoid such an erroneous detection, an increased number of the antennas may be deployed at an increased number of locations. In the configuration with the increased number of the antennas, the position of the mobile terminal may be estimated by using difference in intensities of the radio waves detected with the increased antennas. Specifically, the configuration may secure its estimation accuracy by removing a potentially erroneous detection result of a distance, which does not match a distance estimated by using the other antenna, and/or by reducing a weight of the potentially erroneous detection result in consideration of the distance. In this configuration, it would be advantageous to increase the number of installation locations where the antennas are installed in order to secure the accuracy of the estimation. For that reason, although three antennas may suffice in theory to estimate the position of the mobile terminal, the configuration in reality may require to increase the number of antennas more in order to ensure the estimation accuracy. Thus, the configuration may actually require to provide a larger number of antennas, for example, eight antennas.

According to an example of the present disclosure, a mobile terminal position detecting device is configured to detect an existence position of a mobile terminal in a vehicle compartment by detecting a radio wave from the mobile terminal. The mobile terminal position detecting device comprises a reception strength detection unit connected to a plurality of reception antennas located in the vehicle compartment and configured to detect a reception strength of the radio wave from the mobile terminal for each of the plurality of reception antennas. The mobile terminal position detecting device further comprises a reception determination unit connected to an auxiliary antenna located at a predetermined position that is a blind spot of the reception antenna in the vehicle compartment and configured to determine whether the radio wave from the mobile terminal has been received by the auxiliary antenna. The mobile terminal position detecting device further comprises an existence position calculation unit configured to calculate the existence position of the mobile terminal based on the reception strength detected by the plurality of reception antennas when the radio wave from the mobile terminal has not been received by the plurality of auxiliary antenna. The mobile terminal position detecting device further comprises an existence position determination unit configured to determine, as the existence position of the mobile terminal, the predetermined position at which the auxiliary antenna receiving the radio wave is located when the radio wave from the mobile terminal has been received by the auxiliary antenna.

The mobile terminal position detecting device possibly enables to accurately detect an existence position of a mobile terminal in a vehicle compartment without increasing the number of antennas.

In the following, examples will be described in order to clarify the contents of the above-mentioned problems of the present application.

A. Device Configuration:

FIG. 1 shows a rough structure of a vehicle 1 on which a mobile terminal position detecting device 100 is mounted according to the present embodiment. As shown in the figure, reception antennas 10 are mounted at four locations in a vehicle compartment of the vehicle 1. In other words, a reception antenna 10a is mounted in the vicinity of a driver's seat 2a, a reception antenna 10b is mounted in the vicinity of a front passenger seat 2b, a reception antenna 10c is mounted at a position rightward from a rear seat 2c, and a reception antenna 10d is mounted at a position leftward from the rear seat 2c.

When there is no need to distinguish the driver's seat 2a, the front passenger seat 2b, and the rear seat 2c from each other, those seats are simply referred to as seats 2. Similarly, the reception antennas 10a, 10b, 10c, and 10d are also referred to simply as reception antennas 10 when there is no need to distinguish those reception antennas 10a, 10b, 10c, and 10d from each other.

Those reception antennas 10 are connected to a mobile terminal position detecting device 100 by respective connection cables, but respective connection cables do not simply connect the reception antennas 10 to the mobile terminal position detecting device 100. For example, a connection cable a for connecting the reception antenna 10a mounted in the vicinity of the driver's seat 2a and the mobile terminal position detecting device 100 is wired such that a middle portion of the connection cable a meanders a seating surface and a backrest surface of the driver's seat 2a. The meandering portion forms an auxiliary antenna 20a to be described later.

Similarly, a connection cable b for connecting the reception antenna 10b mounted in the vicinity of the front passenger seat 2b and the mobile terminal position detecting device 100 is wired such that a middle portion of the connection cable b meanders a seating surface and a backrest surface of the front occupant seat 2b to form an auxiliary antenna 20b.

Similarly, middle portions of a connection cable c for connecting the reception antenna 10c and the mobile terminal position detecting device 100 and a connection cable d for connecting the reception antenna 10d and the mobile terminal position detecting device 100 meander on the right side and the left side of the rear seat 2c, respectively, thereby forming auxiliary antennas 20c and 20d, respectively.

A connection cable e connected to the mobile terminal position detecting device 100 is not connected to any of the reception antennas 10, but a front end side of the connection cable e is wired so as to meander on a center seating surface and a backrest surface of the rear seat 2c, thereby forming an auxiliary antenna 20e.

Figure 2A:
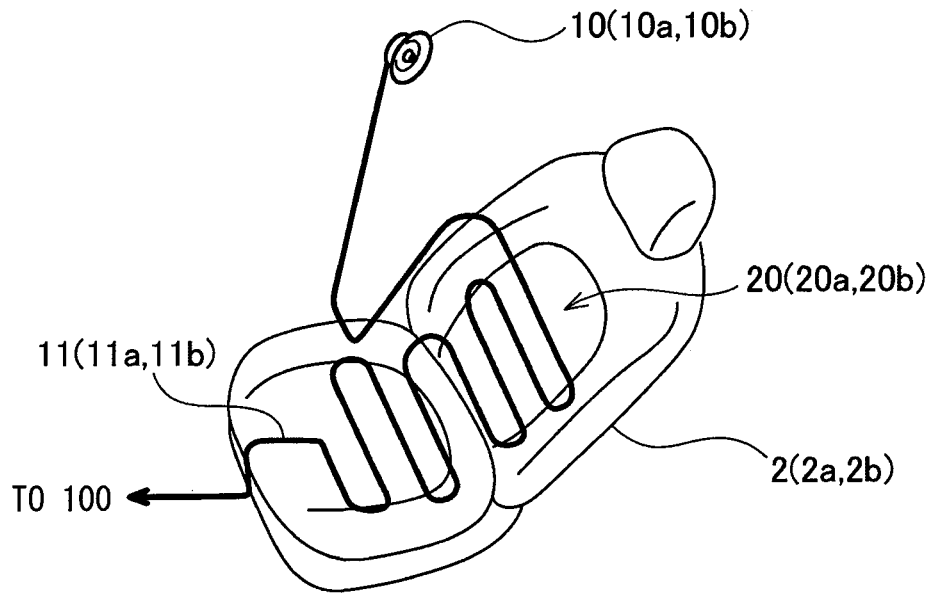
FIGS. 2A and 2B are illustrative views exemplifying a state in which a connection cable connected to the mobile terminal position detecting device is wired so as to meander on a seating surface and a backrest surface of a seat.

FIG. 2A illustrates a state in which the auxiliary antenna 20a (or the auxiliary antenna 20b) is formed by wiring the connection cable a (or the connection cable b) that connects the mobile terminal position detecting device 100 and the reception antenna 10a (or the reception antenna 10b) so as to meander on the seating surface and the backrest surface of the driver's seat 2a (or the front passenger seat 2b).

Figure 2B:
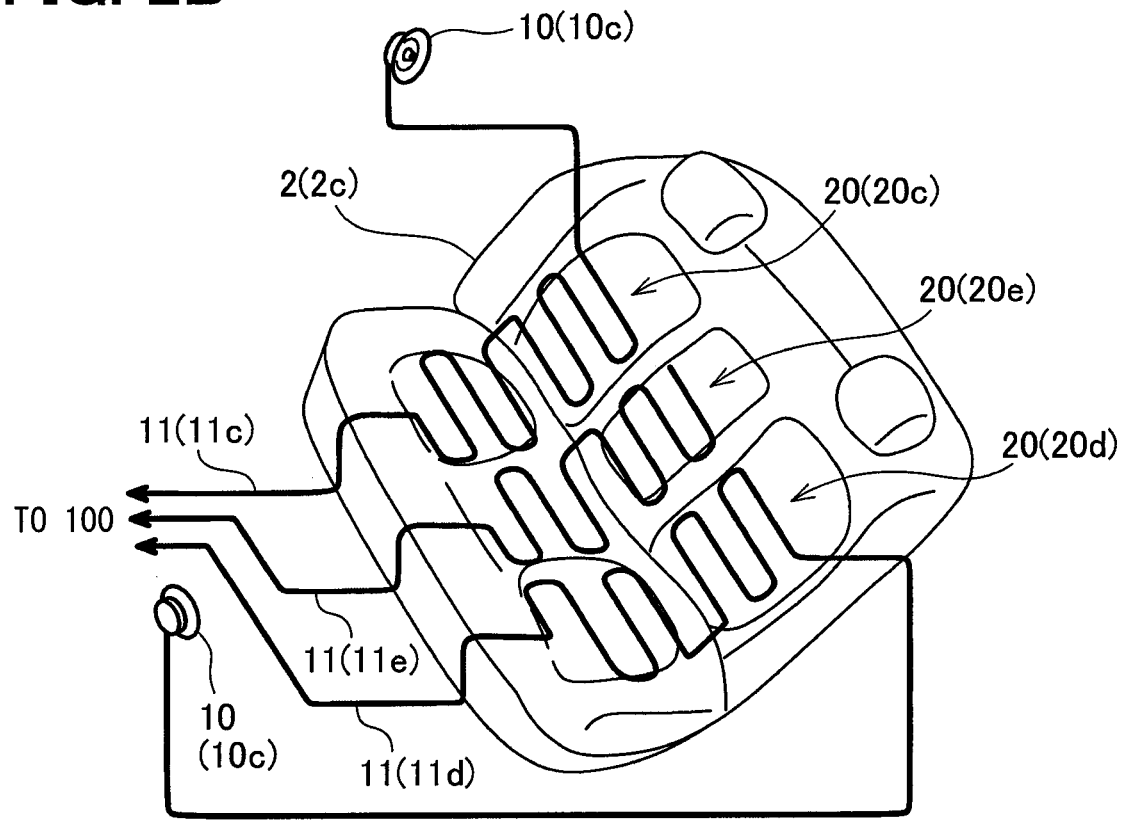

FIG. 2B illustrates a state in which the auxiliary antenna 20c is formed by wiring the connection cable c connecting the mobile terminal position detecting device 100 and the reception antenna 10c so as to meander on a right side seating surface and a backrest surface of the rear seat 2c. Similarly, the connection cable d for connecting the mobile terminal position detecting device 100 and the reception antenna 10d is wired so as to meander on a left side seating surface and a backrest surface of the rear seat 2c, thereby forming the auxiliary antenna 20d.

Further, the connection cable e is wired so as to meander on a center seating surface and a backrest surface of the rear seat 2c, thereby forming the auxiliary antenna 20e.

The auxiliary antenna 20 formed by meandering the connection cable is as follows.

Figure 3A:
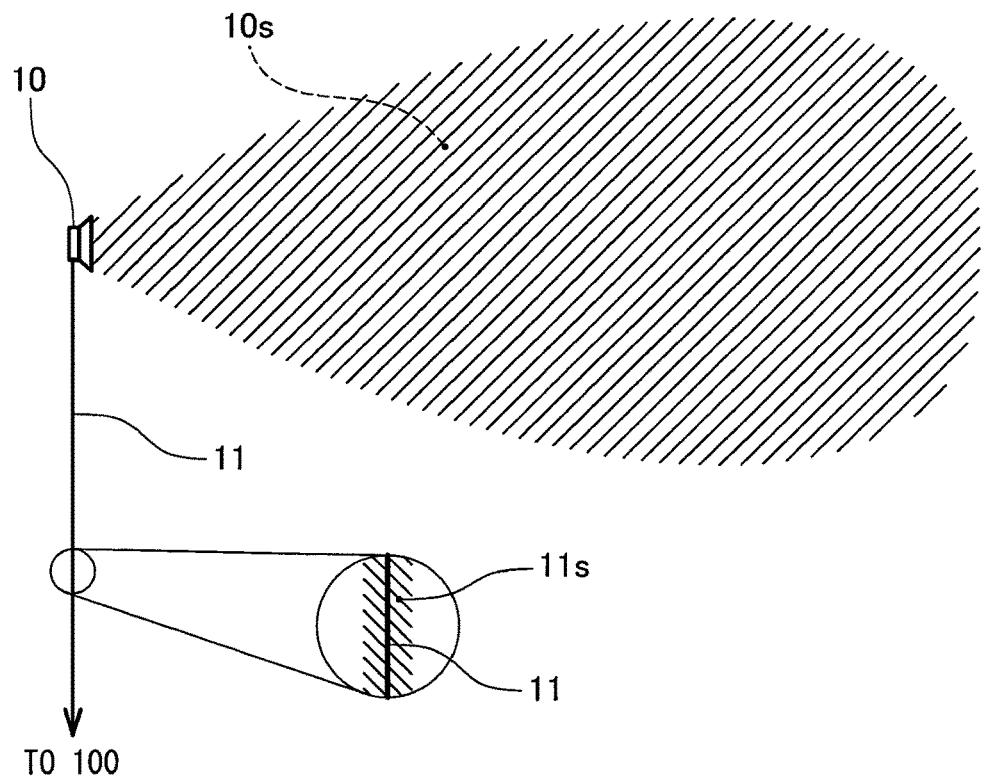
FIGS. 3A and 3B are illustrative views of a reason why an auxiliary antenna is formed by a connection cable of a reception antenna.

In general, the reception antenna 10 has a wide receivable range, and can receive the radio waves from a radio wave transmission source even when the radio wave transmission source such as a mobile terminal is at a distance of several meters or more. FIG. 3A conceptually shows a receivable range 10s of the reception antenna 10 having directivity.

The radio wave received by the reception antenna 10 is transmitted to a reception device (in the present embodiment, the mobile terminal position detecting device 100) through a connection cable. In fact, the connection cable also has a receivable range of about 5 cm with the connection cable as a center. If the radio wave transmission source is separated from the connection cable by 10 cm or more, the radio waves from the radio wave transmission source cannot be received, and therefore although usually overlooked, when the radio wave transmission source is located at a distance of about several centimeters from the connection cable, the radio waves can be received even in the connection cable.

Figure 3B:
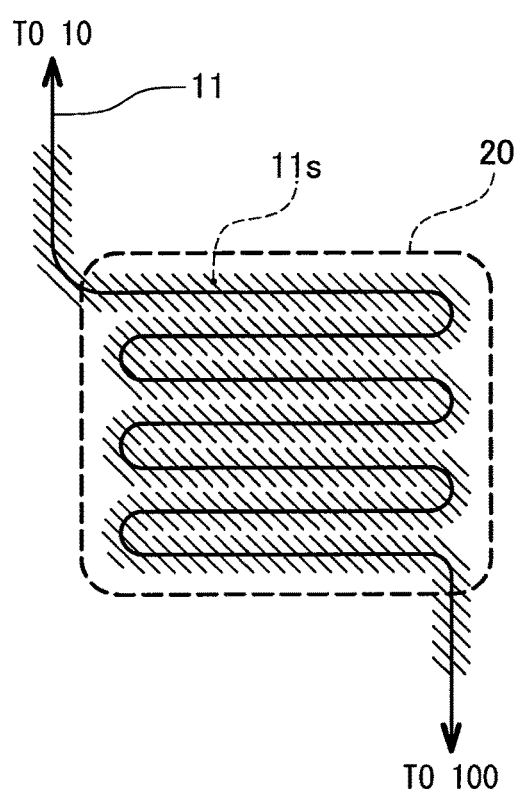

Therefore, as shown in FIG. 3B, a part of the connection cable is meandered in a plane shape. With the above configuration, the auxiliary antenna 20 having a receivable range having a thickness of about 5 cm can be formed on both sides of the meandering surface of the connection cable as the center.

In the present embodiment, although a description is made on the assumption that a middle portion of the connection cable meanders the seating surface and the backrest surface of the seat 2, the auxiliary antenna 20 may be formed by meandering either one of the seating surface and the backrest surface.

Figure 4:
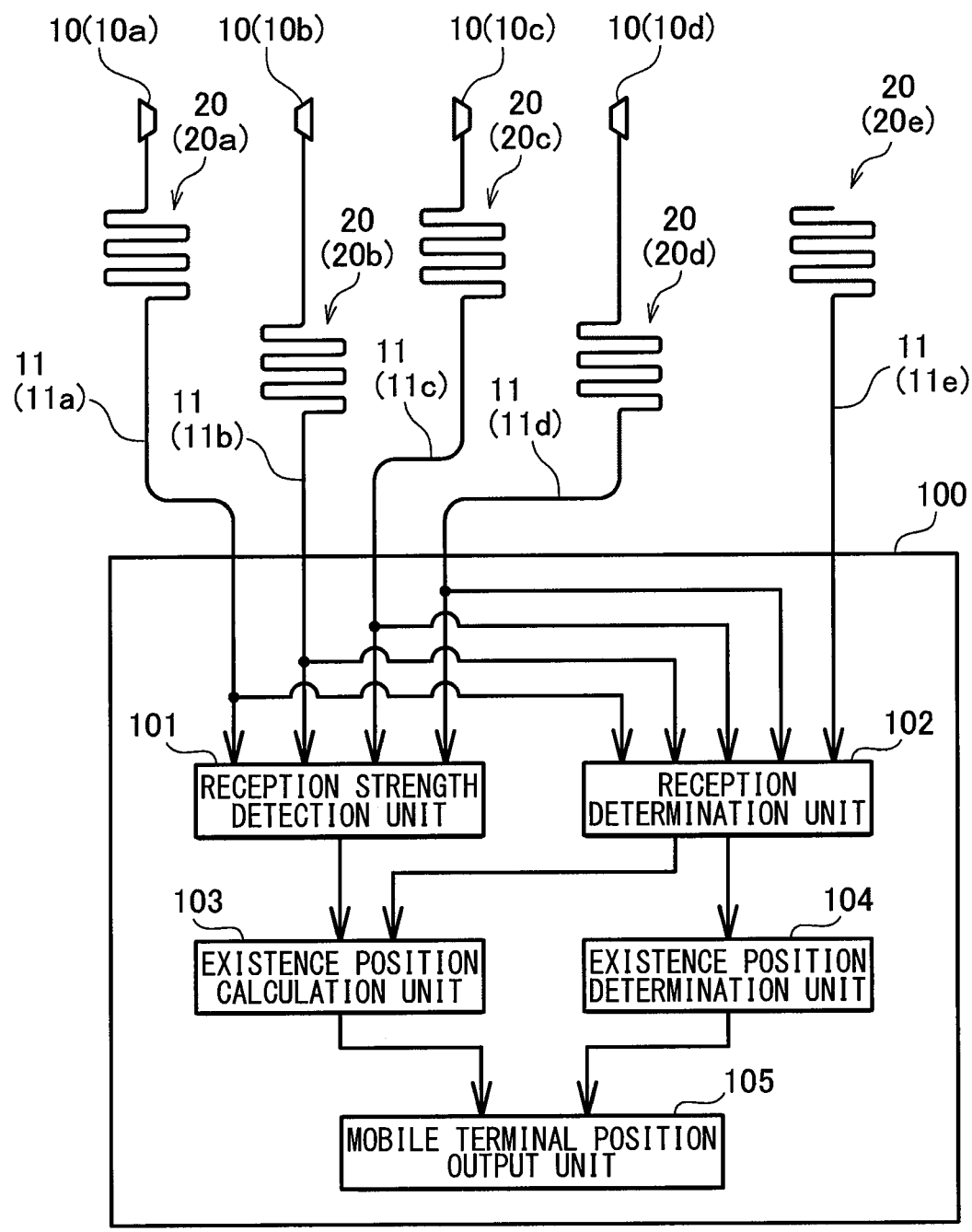
FIG. 4 is a block diagram showing an internal configuration of the mobile terminal position detecting device according to the present embodiment.

FIG. 4 shows a rough internal structure of the mobile terminal position detecting device 100 according to the present embodiment. As shown in the figure, the mobile terminal position detecting device 100 includes a reception strength detection unit 101, a reception determination unit 102, an existence position calculation unit 103, an existence position determination unit 104, and a mobile terminal position output unit 105.

Those "units" are abstract concepts in which the mobile terminal position detecting device 100 of the present embodiment classifies an inside of the mobile terminal position detecting device 100 for convenience, focusing on the function of detecting the existence position of the mobile terminal existing in the vehicle compartment. Therefore, the inside of the mobile terminal position detecting device 100 is not physically divided into those "units". Those "units" can be realized as a computer program executed by a CPU, can be realized as an electronic circuit including an LSI, or can be realized as a combination of the computer program and the electronic circuit.

The reception strength detection unit 101 is connected to the reception antennas 10a to 10d through connection cables a to d. For that reason, when the reception antennas 10a to 10d receive the radio waves from the mobile terminal, the radio waves are transmitted through the connection cables a to d, and the reception strength of the radio waves at the reception antennas 10a to 10d can be detected. As described above with reference to FIGS. 1 and 2(a), 2(b), the connection cables a to d form the auxiliary antennas 20a to 20d by being wired in a state in which the connection cables are partially meandering.

The reception determination unit 102 is connected to the auxiliary antennas 20a to 20d through the connection cables a to d, and when the auxiliary antennas 20a to 20d receive the radio waves, the radio waves are transmitted to the reception determination unit 102. Therefore, the reception determination unit 102 can determine whether or not the auxiliary antennas 20a to 20d have received the radio wave of the mobile terminal. The auxiliary antenna 20e is also connected to the reception determination unit 102 through the connection cable e. For that reason, the reception determination unit 102 can also determine whether or not the auxiliary antenna 20e has received the radio waves of the mobile terminal.

The existence position calculation unit 103 acquires a determination result as to whether or not the radio wave of the mobile terminal has been received by the auxiliary antennas 20a to 20e from the reception determination unit 102. When the radio waves of the mobile terminal have not been received by the auxiliary antennas 20a to 20e, the existence position calculation unit 103 calculates the existence position of the mobile terminal based on the reception strength of the radio waves received by each of the reception antennas 10a to 10d. In other words, if the reception strength of the radio waves at each of the auxiliary antennas 20a to 20d is known, the existence position calculation unit 103 can estimate the distance to the mobile terminal, and if the distance from each of the auxiliary antennas 20a to 20d to the mobile terminal is known, the existence position calculation unit 103 can calculate the existence position of the mobile terminal.

On the other hand, when receiving the determination result indicating that the radio waves of the mobile terminal has been received by the auxiliary antennas 20a to 20e from the reception determination unit 102, the existence position calculation unit 103 does not calculate the existence position of the mobile terminal.

The existence position determination unit 104 also acquires, from the reception determination unit 102, a determination result as to whether or not the radio waves of the mobile terminal has been received by the auxiliary antennas 20a to 20e, similarly to the existence position calculation unit 103 described above. When any of the auxiliary antennas 20a to 20e has received the radio waves of the mobile terminal, the existence position determination unit 104 determines the positions at which the reception antennas 10a to 10d are located as the existence position of the mobile terminal. For example, in the case where the radio waves of the mobile terminal is received by the auxiliary antenna 20a, the reception antenna 10a is located in the driver's seat 2a, and therefore, the existence position determination unit 104 determines the existence position of the mobile terminal in the driver's seat 2a.

On the other hand, when the auxiliary antennas 20a to 20e have not received the radio waves of the mobile terminal, the existence position determination unit 104 does not determine the existence position of the mobile terminal.

The mobile terminal position output unit 105 is connected to the existence position calculation unit 103 and the existence position determination unit 104. When the existence position calculation unit 103 calculates the existence position of the mobile terminal, the mobile terminal position output unit 105 acquires the calculated existence position, and when the existence position determination unit 104 determines the existence position of the mobile terminal, the mobile terminal position output unit 105 acquires the determined existence position and outputs the acquired existence position to the outside.

When the existence position calculation unit 103 does not calculate the existence position of the mobile terminal and the existence position determination unit 104 does not determine the existence position of the mobile terminal, the mobile terminal position output unit 105 outputs the fact that there is no mobile terminal to the outside.

As described above, the mobile terminal position detecting device 100 according to the present embodiment detects the existence position of the mobile terminal with the use of the reception antenna 10 and the auxiliary antenna 20 in combination. For that reason, the existence position of the mobile terminal can be detected with sufficient accuracy without increasing the number of mounting locations of the reception antennas 10 mounted in the vehicle compartment. It is needless to say that the auxiliary antennas 20 are added in addition to the reception antennas 10, but since the auxiliary antennas 20 are only a part of the connection cables of the reception antennas 10, the auxiliary antennas 20 can be added much more easily than when the reception antennas 10 are added.

Hereinafter, in order to realize the above configuration, a process in which the mobile terminal position detecting device 100 of the present embodiment detects the existence position of the mobile terminal will be described.

Figure 5:
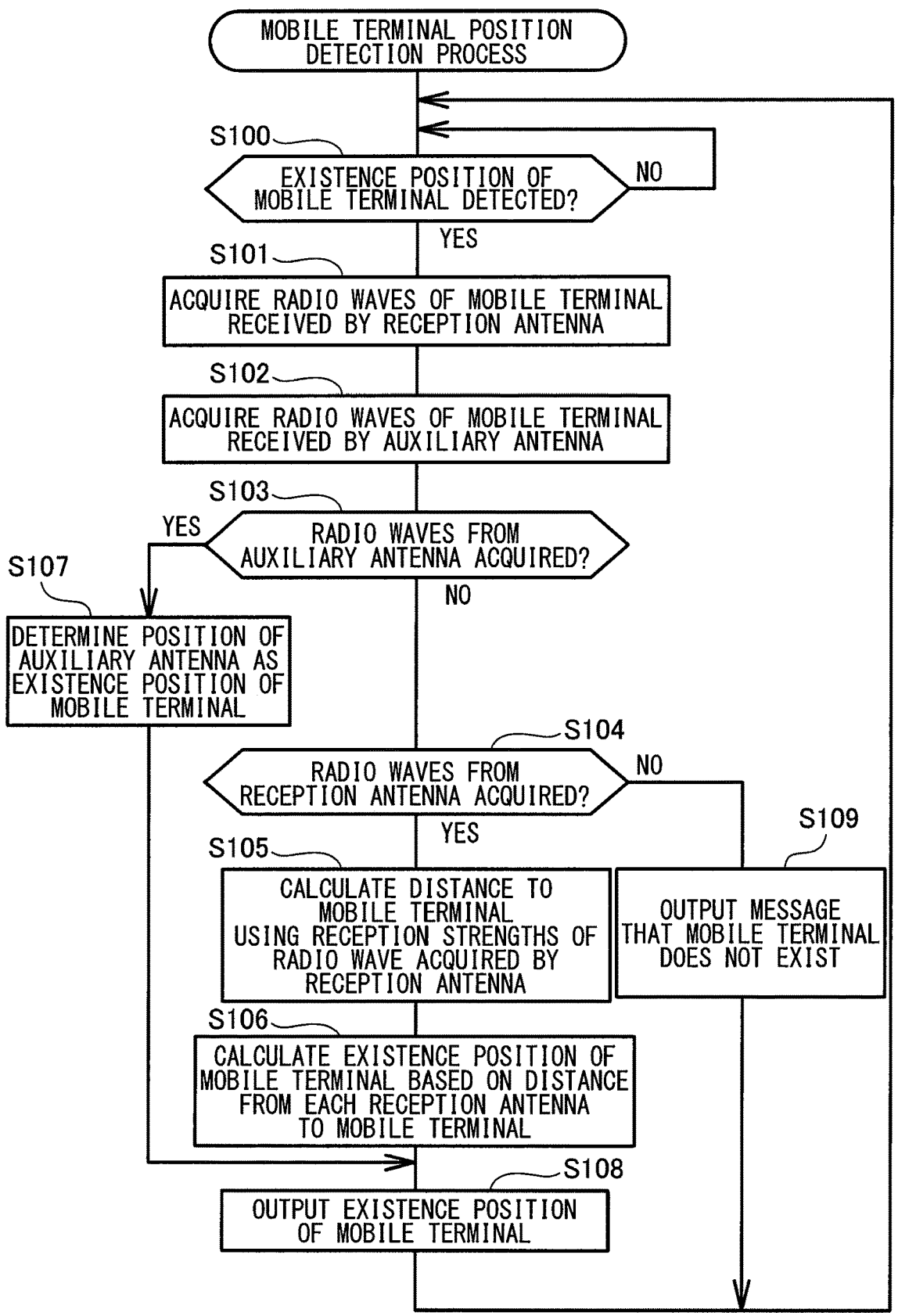
FIG. 5 is a flowchart of a mobile terminal position detection process.

B. Mobile Terminal Position Detection Process:

FIG. 5 shows a flowchart of a mobile terminal position detection process executed by the mobile terminal position detecting device 100 according to the present embodiment.

As shown in the figure, in the mobile terminal position detection process, first, it is determined whether or not the existence position of the mobile terminal in the vehicle compartment is detected (S100). In the present embodiment, the existence position is detected every time a predetermined time (for example, 3 seconds) elapses, but the existence position of the mobile terminal may be detected when a request is received from another program.

As a result, when it is determined that the existence position of the mobile terminal is not detected (no in S100), the same determination (S100) is repeated to enter a waiting state.

On the other hand, when it is determined that the existence position of the mobile terminal is detected (yes in S100), the radio waves of the mobile terminal received by the reception antennas 10a to 10d are acquired from the reception antennas 10a to 10d, respectively (S101). Subsequently, the radio waves of the mobile terminal received by the auxiliary antennas 20a to 20e are acquired from the respective auxiliary antennas 20a to 20e (S102).

In this example, since both the reception antenna 10a and the auxiliary antenna 20a are connected to the mobile terminal position detecting device 100 by the connection cable a, both the radio waves received by the reception antenna 10a and the radio waves received by the auxiliary antenna 20a are input to the mobile terminal position detecting device 100 through the connection cable a. However, the radio waves received by the reception antenna 10a and the radio waves received by the auxiliary antenna 20a can be easily distinguished from each other based on the reception strength of the radio waves. In other words, as described above with reference to FIGS. 3A and 3B, a range in which the auxiliary antenna 20a can receive the radio waves is limited to a range in which a distance from the auxiliary antenna 20a falls within about 5 centimeters. On the other hand, the range in which the reception antenna 10a can receive the radio waves reaches a range in which the distance from the reception antenna 10a is around several meters, and in many cases, the distance from the reception antenna 10a to the mobile terminal is 1 meter or more.

Generally, the reception strength of the radio waves becomes smaller as the distance to the transmission source of the radio waves (in this case, the mobile terminal) becomes longer, so that the reception strength of the radio waves received by the reception antenna 10a becomes significantly smaller than the reception strength of the radio waves received by the auxiliary antenna 20a. Therefore, when a magnitude of the radio waves input from the connection cable a is larger than a predetermined threshold, it can be determined that the radio waves have been received by the auxiliary antenna 20a, and conversely, when the magnitude is smaller than the threshold, it can be determined that the radio waves have been received by the reception antenna 10a.

The same applies to the reception antenna 10b and the auxiliary antenna 20b connected through the connection cable b, the reception antenna 10c and the auxiliary antenna 20c connected through the connection cable c, and the reception antenna 10d and the auxiliary antenna 20d connected through the connection cable d.

Figure 6:
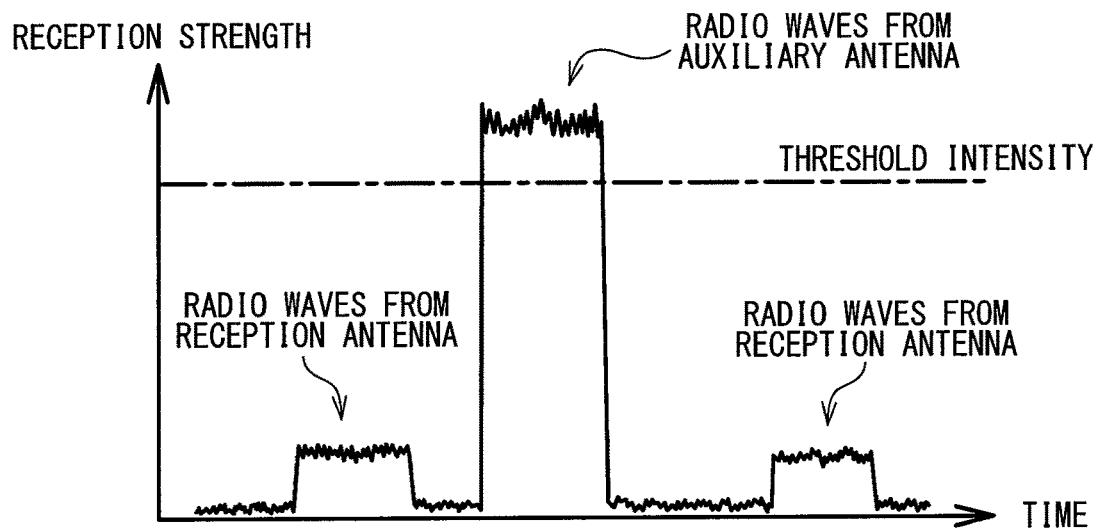
FIG. 6 is an illustrative diagram showing a state in which radio waves from the reception antenna and radio waves from the auxiliary antenna are input to the mobile terminal position detecting device through the connection cable.

FIG. 6 conceptually shows a state in which the radio waves from the reception antenna 10 and the radio waves from the auxiliary antenna 20 are input through the connection cable. As shown in the figure, since the radio waves from the reception antenna 10 and the radio waves from the auxiliary antenna 20 are greatly different from each other in reception strength, if an appropriate threshold intensity is set in advance, the radio waves from the reception antenna 10 and the radio waves from the auxiliary antenna 20 can be easily distinguished from each other.

Therefore, in S101, the radio waves received by the reception antennas 10a to 10d are acquired by detecting radio waves having a reception strength smaller than a predetermined threshold intensity for each of the connection cables a to d connected to the mobile terminal position detecting device 100.

In S102, the radio waves received by the auxiliary antennas 20a to 20e are acquired by detecting the radio waves having a reception strength larger than a predetermined threshold intensity for each of the connection cables a to e connected to the mobile terminal position detecting device 100.

Next, the mobile terminal position detecting device 100 determines whether or not the radio waves from the auxiliary antennas 20 have been acquired (S103 in FIG. 5). When the radio waves from the multiple mobile terminals are acquired in S101 and S102, it is determined whether or not the radio waves from the auxiliary antennas 20 are acquired for each of the mobile terminals. For example, in S101 and S102, it is assumed that the radio waves from two mobile terminals A and B are acquired. It is assumed that the radio waves from the reception antenna 10 and the auxiliary antenna 20 are acquired for the mobile terminal A of those mobile terminals, and the radio waves from the reception antenna 10 are acquired for the mobile terminal B, but the radio waves from the auxiliary antenna 20 are not acquired. In such cases, the determination of "yes" is made for the mobile terminal A but the determination of "no" is made for the mobile terminal B in S103.

As a result, when the radio waves from the auxiliary antenna 20 has not been acquired (no in S103), it is determined whether or not the radio waves from the reception antenna 10 has been acquired (S104). When the radio wave from the reception antenna 10 is not acquired (S104: no), it is considered that since the mobile terminal is not present in the vehicle compartment, this fact is output to the outside (S109).

On the other hand, when the radio waves from the reception antenna 10 has been acquired (yes in S104), the reception strength of the radio waves acquired by each of the reception antennas 10a to 10d is returned to the distance from each of the reception antennas 10a to 10d to the mobile terminal (S105). As described above, since the reception strength of the radio waves becomes smaller as the distance from the antenna to the transmission source of the radio waves becomes larger, if the reception strength of the radio waves is known, the distance to the transmission source (in this example, the mobile terminal) can be obtained.

Then, after the existence position of the mobile terminal has been calculated based on the distances from the respective reception antennas 10a to 10d to the mobile terminal obtained in this manner (S106), the obtained existence position of the mobile terminal is output to the outside (S108). Since a method of calculating the existence position of the mobile terminal based on the distances from the multiple reception antennas 10 to the mobile terminal is well known, a description of the method will be omitted.

In the above description, the existence position of the mobile terminal is calculated based on the reception strength of the radio waves received by the reception antenna 10 when it is determined that the radio waves from the auxiliary antenna 20 is not acquired (no in S103).

On the other hand, when the radio waves from the auxiliary antenna 20 is acquired (yes in S103), the position at which the auxiliary antenna 20 that has acquired the radio waves is located is determined as the existence position of the mobile terminal (S107). For example, when the auxiliary antenna 20 that has acquired the radio waves from the mobile terminal is the auxiliary antenna 20a, since the auxiliary antenna 20a is located in the driver's seat 2a (refer to FIGS. 1 and 2), it is determined that the existence position of the mobile terminal is the driver's seat 2a. When radio waves of multiple mobile terminals are acquired by the auxiliary antenna 20, the existence position of each mobile terminal is determined.

After the existence position of the mobile terminal has been determined in this manner, the determined existence position is output to the outside (S108), the process returns to the beginning, and it is again determined whether or not the existence position of the mobile terminal is detected (S100).

The mobile terminal position detecting device 100 of the present embodiment detects the existence position of the mobile terminal in the vehicle compartment by repeating the above processing. For that reason, even if the mounting position of the reception antenna 10 in the vehicle compartment is not increased to five or more positions, the existence position of the mobile terminal can be accurately detected. The reason will be described with reference to FIG. 7.

Figure 7:
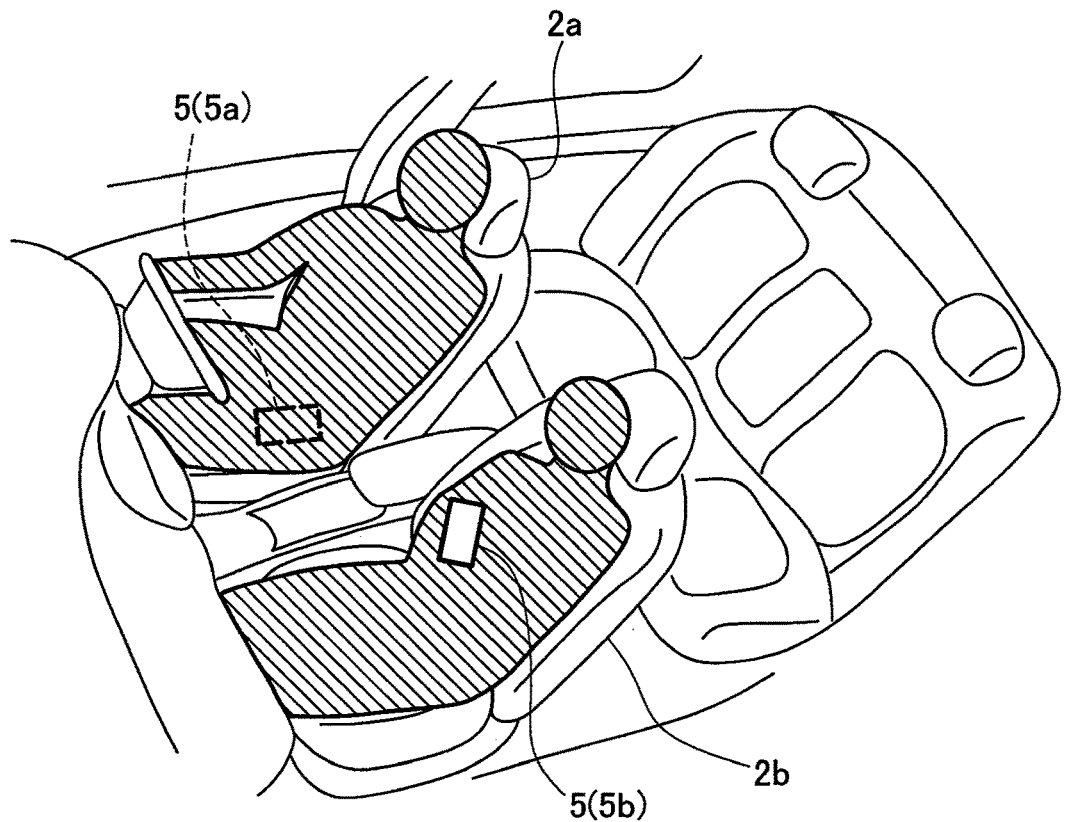
FIG. 7 is an illustrative view of a reason why the mobile terminal position detecting device can detect the position of the mobile terminal with high accuracy without increasing the number of reception antennas according to the present embodiment.

FIG. 7 illustrates a state in which two occupants ride in the vehicle compartment. Although both of the two occupants carry the mobile terminals 5, the occupant who is seated in the driver's seat 2a puts a mobile terminal 5a in a buttock pocket of a trouser, and the occupant who is seated in the front passenger seat 2b holds a mobile terminal 5b in his hand.

In general, the radio waves emitted from the mobile terminal are attenuated when encountering an obstacle. In particular, when passing through a human body, the radio waves are greatly attenuated. For that reason, the radio waves from the mobile terminal 5b existing in the front passenger seat 2b reach the reception antennas 10a to 10d without being greatly attenuated by an obstacle (in particular, the human body), but the radio waves of the mobile terminal 5a existing in the driver's seat 2a are greatly attenuated when passing through the human body. As a result, if the distances from each of the reception antennas 10a to 10d to the mobile terminals 5a and 5b are obtained based on the reception strength of the radio waves, the distance to the mobile terminal 5b can be obtained relatively accurately, but a large error is included in the distance to the mobile terminal 5a, and an erroneous existence position of the mobile terminal 5a is obtained.

Conventionally, in order to avoid the occurrence of such a situation, the number of places where the reception antennas 10 are mounted is increased in the vehicle compartment, and in some of the reception antennas 10, even if the radio waves are greatly attenuated due to the influence of the obstacle (in particular, a human body), a correct existence position has needed to be obtained with the use of the remaining reception antennas 10.

On the other hand, in the present embodiment, as described above with reference to FIG. 2A, the auxiliary antenna 20a is located on the seating surface and the backrest surface of the driver's seat 2a. As described above with reference to FIGS. 3A and 3B, the auxiliary antenna 20a receives the radio waves from a transmission source existing within a range of about 5 cm from the surfaces on which the auxiliary antenna 20a is located (in this example, the seating surface and the backrest surface of the driver's seat 2a). Accordingly, the auxiliary antenna 20a can receive the radio waves from the mobile terminal 5a illustrated in FIG. 7 (that is, the mobile terminal 5a placed in the buttock pocket of the trouser). Further, since the range in which the auxiliary antenna 20a can receive the radio waves is narrow as described above, the fact that the auxiliary antenna 20a has received the radio waves of the mobile terminal 5a means that the mobile terminal 5a is only present in the immediate vicinity of the position of the auxiliary antenna 20a (in this example, the seating surface and the backrest surface of the driver's seat 2a).

It is needless to say that the occupant who is seated in the driver's seat 2a does not always put the mobile terminal 5a in the buttock pocket. For example, the mobile terminal 5a may be in a chest pocket. Alternatively, the mobile terminal 5a may be placed in a waist pouch so that the waist pouch comes to an abdomen. However, in those cases, as in the mobile terminal 5b present in the front passenger seat 2b, there is no significant difference from the case where the occupant holds the mobile terminal 5b by hand, so that the existence position can be correctly detected by receiving the radio waves by the reception antennas 10a to 10d. When a waist pouch containing the mobile terminal 5a is turned to a back side of the human body, the mobile terminal 5a can be detected by the auxiliary antenna 20a located on the backrest surface of the driver's seat 2a.

As described above, if the auxiliary antenna 20a is located on the seating surface and the backrest surface of the driver's seat 2a, even when the occupant seated in the driver's seat 2a carries the mobile terminal 5a in any manner, the existence position of the mobile terminal 5a can be accurately detected with the use of the reception antennas 10a to 10d or the auxiliary antenna 20a.

The same applies to the case where the occupant is seated in the front passenger seat 2b or the rear seat 2c. For that reason, the mobile terminal position detecting device 100 of the present embodiment can accurately detect the position of the mobile terminal present in the vehicle interior without increasing the number of mounting locations of the reception antennas 10 in the vehicle compartment.

C. Modification:

There are several modifications to the embodiment described above. Hereinafter, those modifications will be briefly described focusing on differences from the present embodiment.

C-1. First Modification:

The auxiliary antenna 20 of the present embodiment described above has been described as being located on the seating surface and the backrest surface of the seat 2 at 20a.

However, the position at which the auxiliary antenna 20 is located is not necessarily limited to the seating surface or the backrest surface of the seat 2. For example, if the auxiliary antenna 20 is located at a position where the radio waves are attenuated before being received by the reception antennas 10a to 10d (that is, a position of a blind spot of the reception antennas 10a to 10d), the existence position of the mobile terminal 5 can be accurately detected without increasing the number of the reception antennas 10.

Figure 8:
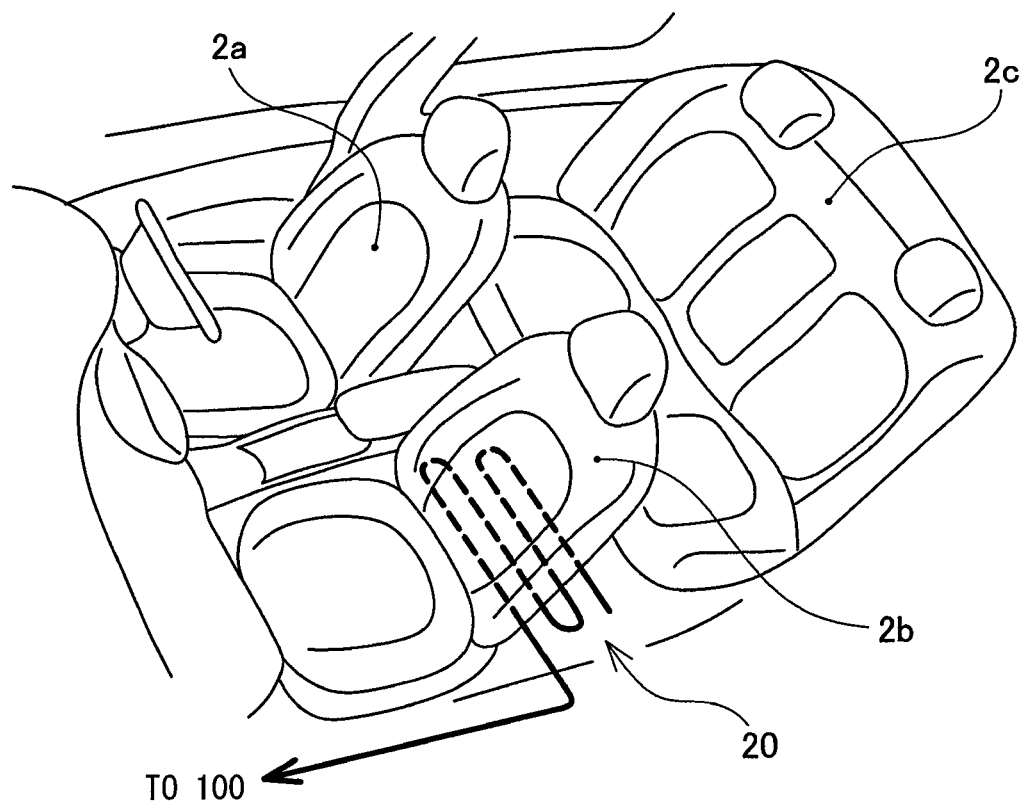
FIG. 8 is an illustrative view of a first modification in which an auxiliary antenna is located on a floor surface of a vehicle compartment.

FIG. 8 illustrates a state in which the auxiliary antenna 20 is located on the floor surface of the vehicle. The floor surface of the vehicle is located at the back of the seat 2 and the dashboard as seen from a side of the reception antennas 10a to 10d. For that reason, when a bag or the like in which the mobile terminal 5 is placed is placed on the floor surface, the radio waves from the mobile terminal 5 is blocked by the seat 2 or an occupant seated in the seat 2, and the strength of the radio waves is attenuated until the radio waves are received by the reception antennas 10a to 10d.

Therefore, as illustrated in FIG. 8, if the auxiliary antenna 20 is located on the floor of the vehicle, the existence position of the mobile terminal 5 can be accurately detected even in such a case.

Alternatively, even if the position does not become a blind spot of the reception antennas 10a to 10d, the existence position of the mobile terminal 5 can be detected with higher accuracy by placing the auxiliary antenna 20.

Figure 9:
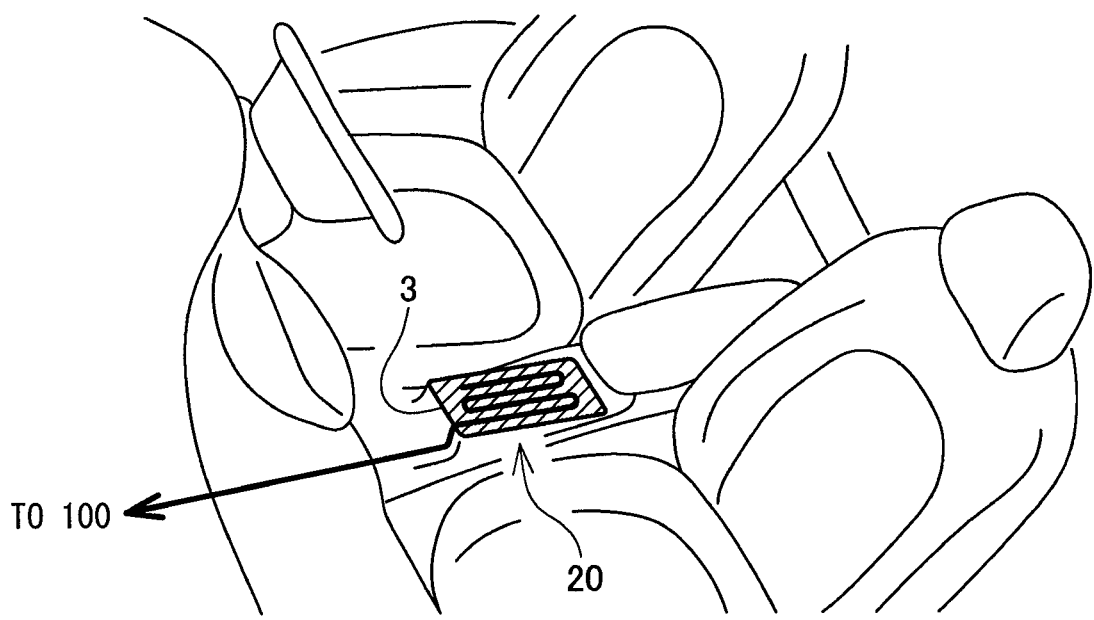
FIG. 9 is an illustrative diagram illustrating another configuration of the first modification.

For example, as shown in FIG. 9, when a charging plate 3 for charging the mobile terminal 5 without contact is mounted, the auxiliary antenna 20 may be located on a back side of a surface on which the mobile terminal 5 is mounted on the charging plate 3. This makes it possible to detect the existence position of the mobile terminal 5 placed on the charging plate 3 with a pinpoint.

C-2. Second Modification:

The auxiliary antenna 20 of the present embodiment described above has been described as being formed by wiring a part of a connection cable connecting the reception antenna 10 and the mobile terminal position detecting device 100 in a meandering manner.

However, the meandered portion of the connection cable may be unitized in advance, and the unitized auxiliary antenna 20 may be incorporated in a middle of the connection cable which connects the reception antenna 10 and the mobile terminal position detecting device 100.

Figure 10:
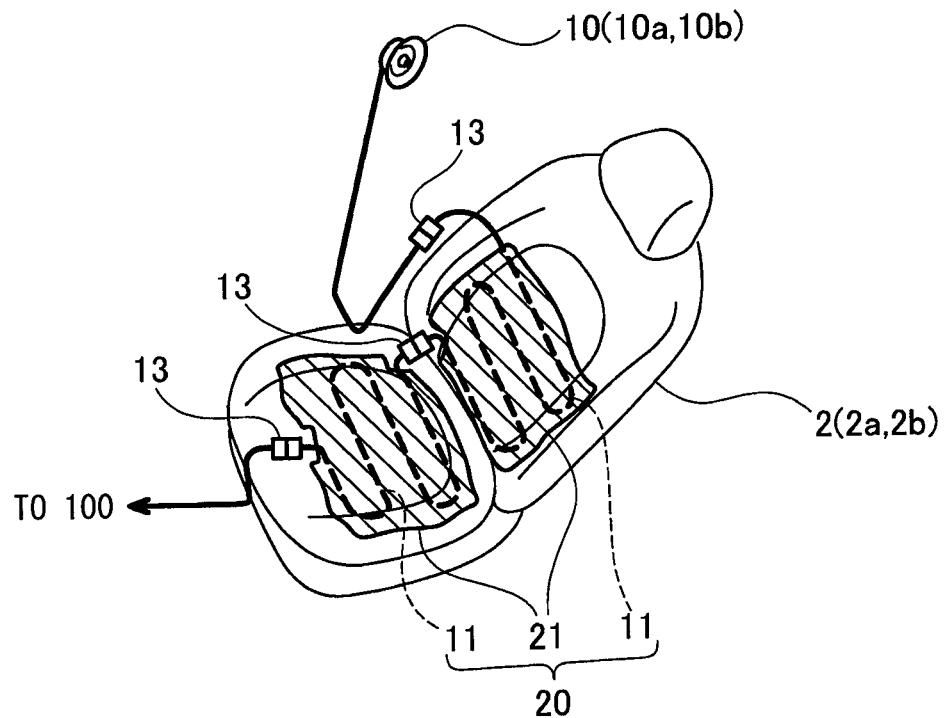
FIG. 10 is an illustrative diagram of a second modification in which an auxiliary antenna is unitized.
Figure 11:
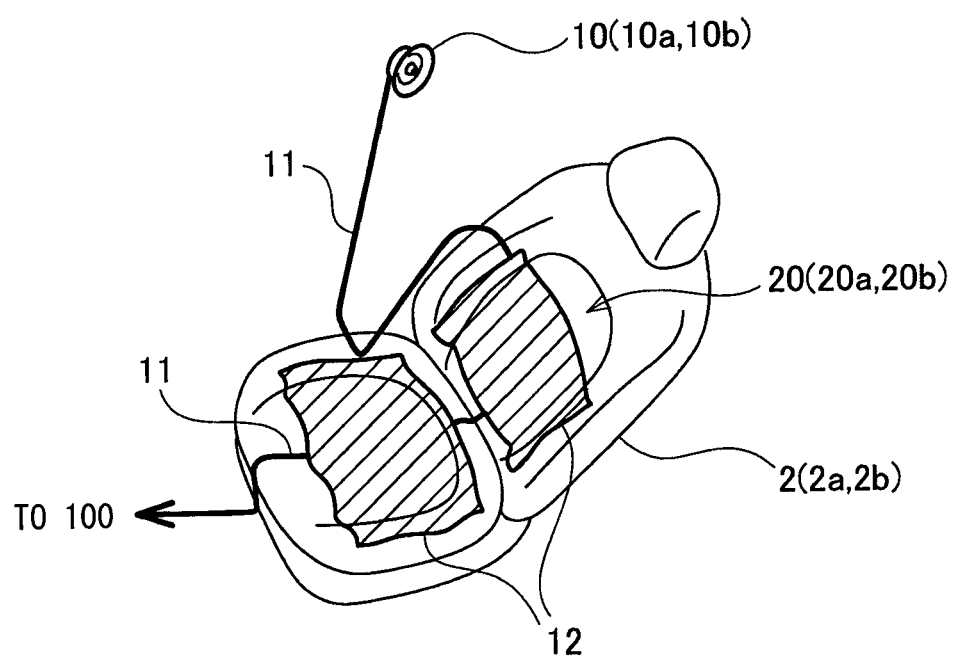
FIG. 11 is an illustrative view of a third modification in which a sheet made of a conductive material is used as an auxiliary antenna.

FIG. 10 illustrates a second modification in which the auxiliary antenna 20 is unitized. As shown in the figure, the auxiliary antenna 20 according to the second modification is formed by wiring the connection cable in a meandering state inside a flat pad 21 made of a flexible material. Both ends of the meandering connection cable are pulled out to the outside of the pad 21, and a connector 13 is attached to each end portion.

The auxiliary antennas 20 are connected to each other by the connector 13, and further, a connection cable from the mobile terminal position detecting device 100 and a connection cable from the reception antenna 10 are also connected to each other with the use of the connector 13.

In this way, the auxiliary antenna 20 can be easily mounted by connection with the use of the connector 13 even if a long connection cable is not wired in the vehicle compartment.

C-3. Third Modification:

Further, the auxiliary antenna 20 of the present embodiment described above has been described as being formed by wiring a connection cable in a meandering manner.

However, instead of meandering the connection cable, the auxiliary antenna 20 may be formed with the use of a member made of a conductive material and formed in a foil shape or a plate shape.

The figure illustrates a state in which the auxiliary antenna 20 is formed by incorporating a foil-like sheet 12 made of a conductive material in the middle of the connection cable. Even when the above sheet 12 is used as the auxiliary antenna 20, the sheet 12 can receive the radio waves from the mobile terminal 5 if the mobile terminal 5 falls within a range of about 5 cm from a surface of the sheet 12. For that reason, the existence position of the mobile terminal 5 can be detected by the same mechanism as that of the auxiliary antenna 20 formed by meandering the connection cable.

C-4. Fourth Modification:

Further, the auxiliary antenna 20 of the present embodiment described above has been described as being formed by wiring a connection cable in a meandering manner.

Figure 12A:
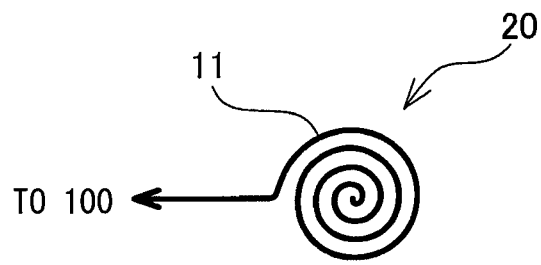
FIGS. 12A and 12B are illustrative views of a fourth modification in which a connection cable is spirally wired.
Figure 12B:
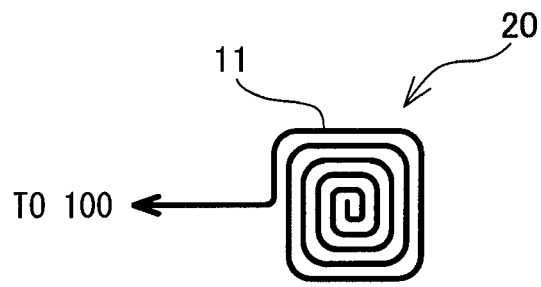

However, if the connection cable can be wired in a plane shape, the connection cable is not necessarily meandering, and for example, as illustrated in FIGS. 12A and 12B, the auxiliary antenna 20 can be formed by wiring the connection cable in a spiral shape.

In order to solve the problems described above, in the mobile terminal position detecting device and the mobile terminal position detecting method according to the present disclosure, the reception antennas are located at multiple positions in the vehicle interior, and the auxiliary antenna is located at a predetermined position that is a blind spot of the reception antennas in the vehicle compartment. When the radio waves from the mobile terminal have been received by the auxiliary antenna, the position at which the auxiliary antenna is located is determined as the existence position of the mobile terminal. On the other hand, when the radio waves from the mobile terminal is not received by the auxiliary antenna, the existence position of the mobile terminal is detected based on the reception strength of the radio waves received by the multiple reception antennas.

This makes it possible to accurately detect the existence position of the mobile terminal without increasing the number of reception antennas 10 mounted in the vehicle compartment. Further, since it is only necessary to determine whether or not the radio wave from the mobile terminal has been received, and it is not necessary to detect the reception strength, the auxiliary antenna can be mounted much more easily than the reception antennas.

Although the present disclosure has been described in accordance with the embodiments, it is understood that the present disclosure is not limited to such examples or structures. The present disclosure encompasses various modifications and variations within the scope of equivalents. In addition, various combinations and configurations, as well as other combinations and configurations that include only one element, more, or less, are within the scope and spirit of the present disclosure.

The invention claimed is:

1. A mobile terminal position detecting device configured to detect a position of a mobile terminal in a vehicle compartment by detecting a radio wave from the mobile terminal, the mobile terminal position detecting device comprising:
a computer having a processor, the computer configured to
wiredly connect to a plurality of reception antennas located in the vehicle compartment and to detect a reception strength of the radio wave from the mobile terminal for each of the plurality of reception antennas;
wiredly connect to a plurality of auxiliary antennas located at predetermined positions in the vehicle compartment that are reception blind spots of the plurality of reception antennas, and to determine whether the radio wave from the mobile terminal is received by one of the plurality of auxiliary antennas;
calculate the position of the mobile terminal based on the reception strength detected by the plurality of reception antennas when the radio wave from the mobile terminal is not received by one of the plurality of auxiliary antennas; and
determine that the position of the mobile terminal is at the predetermined position of one of the plurality of auxiliary antennas, when the radio wave from the mobile terminal is received by the one of the plurality of auxiliary antennas, wherein the plurality of auxiliary antennas are linear members made of a conductive material in a planar shape and configured to form wired connections between the computer and the plurality of reception antennas, and to receive the radio wave from the mobile terminal, and wherein the plurality of reception antennas are configured to connect to the computer by the linear members forming the plurality of auxiliary antennas, and wherein the computer is further configured to determine that the radio wave from the mobile terminal is received by one of the plurality of auxiliary antennas, when the reception strength is larger than a predetermined threshold intensity.

2. A mobile terminal position detecting device configured to detect a position of a mobile terminal in a vehicle compartment by detecting a radio wave from the mobile terminal, the mobile terminal position detecting device comprising:

a computer having a processor, the computer configured to wiredly connect to a plurality of reception antennas located in the vehicle compartment and to detect a reception strength of the radio wave from the mobile terminal for each of the plurality of reception antennas;

wiredly connect to a plurality of auxiliary antennas located at predetermined positions in the vehicle compartment that are reception blind spots of the plurality of reception antennas, and to determine whether the radio wave from the mobile terminal is received by one of the plurality of auxiliary antennas;

calculate the position of the mobile terminal based on the reception strength detected by the plurality of reception antennas when the radio wave from the mobile terminal is not received by one of the plurality of auxiliary antennas; and determine that the position of the mobile terminal is at the predetermined position of one of the plurality of auxiliary antennas, when the radio wave from the mobile terminal is received by the one of the plurality of auxiliary antennas, wherein the plurality of auxiliary antennas are plate-like or foil-like members made of a conductive material and configured to form wired connections between the computer and the plurality of reception antennas, and to receive the radio wave from the mobile terminal, and wherein the plurality of reception antennas are configured to connect to the computer by the plate-like or foil-like members of the plurality of auxiliary antennas, and wherein the computer is further configured to determine that the radio wave from the mobile terminal is received by one of the plurality of auxiliary antennas, when the reception strength is larger than a predetermined threshold intensity.

3. The mobile terminal position detecting device according to claim 1, wherein one or more of the plurality of auxiliary antennas are located on seating surfaces of seats installed in the vehicle compartment.

4. The mobile terminal position detecting device according to claim 1, wherein one or more of the plurality of auxiliary antennas are located on backrest surfaces of seats installed in the vehicle compartment.

5. The mobile terminal position detecting device according to claim 1, wherein one or more of the plurality of auxiliary antennas are located on a floor surface of the vehicle compartment.

6. The mobile terminal position detecting device according to claim 1, wherein the computer is further configured to not calculate the position of the mobile terminal, when the radio wave from the mobile terminal is received by one of the plurality of auxiliary antennas.

7. The mobile terminal position detecting device according to claim 1, wherein each of the plurality of auxiliary antennas corresponds and connects to one of the plurality of receptions antennas.

8. The mobile terminal position detecting device according to claim 1, wherein a radio wave reception range of each of the plurality of auxiliary antennas is smaller than a radio wave reception range of each of the plurality of reception antennas.

9. The mobile terminal position detecting device according to claim 1, further comprising:

the plurality of auxiliary antennas; and the plurality of reception antennas.

10. The mobile terminal position detecting device according to claim 2, wherein the computer is further configured to not calculate the position of the mobile terminal, when the radio wave from the mobile terminal is received by one of the plurality of auxiliary antennas.

11. The mobile terminal position detecting device according to claim 2, wherein each of the plurality of auxiliary antennas corresponds and connects to one of the plurality of reception antennas, and wherein a radio wave reception range of each of the plurality of auxiliary antennas is smaller than a radio wave reception range of each of the plurality of reception antennas.

12. The mobile terminal position detecting device according to claim 2, further comprising:

the plurality of auxiliary antennas; and the plurality of reception antennas.

13. A system for detecting a position of a mobile terminal in a vehicle compartment by detecting a radio wave from the mobile terminal, the system comprising:

a plurality of reception antennas disposed at a plurality of positions in the vehicle compartment, each of the reception antennas has a radio wave reception range and is configured to receive the radio wave from the mobile terminal;

a plurality of auxiliary antennas disposed at a plurality of positions in the vehicle compartment that are different than the positions of the reception antennas, the positions of the auxiliary antennas covering reception blind spots in the radio wave reception ranges of the reception antennas, each of the auxiliary antennas is formed of a conductive material, has a radio wave reception range smaller than the radio wave reception ranges of the reception antennas, and is configured to receive the radio wave from the mobile terminal; and a position detecting device connected to each of the reception antennas by a corresponding signal line, the corresponding signal line for each of the reception antennas including one of the auxiliary antennas as a portion of the signal line, the signal line configured to transmit the radio wave from the mobile terminal to the position detecting device, the position detecting device is configured to determine whether a reception strength of the radio wave from the mobile terminal exceeds a predetermined intensity, in response to the reception strength of the radio wave from the mobile terminal exceeding the predetermined intensity, determine the position of the mobile terminal as the position of one of the auxiliary antennas, and in response to the reception strength of the radio wave from the mobile terminal not exceeding the predetermined intensity, determine the position of the mobile terminal by calculating distances from each of the receptions antennas to the mobile terminal based on the reception strength of the radio wave received by each of the reception antennas.

\* \* \* \* \*